United States Patent [19]
Hawkins

[11] Patent Number: 5,530,246
[45] Date of Patent: Jun. 25, 1996

[54] VIEWING SYSTEM

[75] Inventor: Joseph C. Hawkins, Bracknell, United Kingdom

[73] Assignee: British Aerospace plc, London, United Kingdom

[21] Appl. No.: 177,519

[22] Filed: Mar. 31, 1988

[30] Foreign Application Priority Data

Apr. 13, 1987 [GB] United Kingdom ............ 8708846

[51] Int. Cl.⁶ .................. G02F 1/01; H01L 31/00; F41G 1/32
[52] U.S. Cl. .............. 250/330; 89/41.06; 250/342; 356/4.01
[58] Field of Search ................ 89/41.06; 356/4, 356/5; 250/330, 342

[56] References Cited

U.S. PATENT DOCUMENTS

| | | |
|---|---|---|
| 3,549,231 | 12/1970 | Scidmore et al. |
| 3,698,812 | 10/1972 | Nelson ................ 356/5 |
| 3,992,629 | 11/1976 | Chapman ............. 250/342 |
| 3,997,762 | 12/1976 | Ritchie et al. |
| 4,108,551 | 8/1978 | Weber ................. 356/5 |
| 4,183,482 | 1/1980 | Jozwiak .............. 250/342 |
| 4,386,848 | 6/1983 | Clendenin et al. .... 356/5 |
| 4,542,986 | 9/1985 | Berdanier ........... 356/5 |

FOREIGN PATENT DOCUMENTS

| | | |
|---|---|---|
| 1045422 | 10/1966 | United Kingdom . |
| 1377633 | 12/1974 | United Kingdom . |
| 1405972 | 9/1975 | United Kingdom . |
| 1431857 | 4/1976 | United Kingdom . |
| 1483793 | 8/1977 | United Kingdom . |
| 1523191 | 8/1978 | United Kingdom . |
| 2007385 | 5/1979 | United Kingdom . |
| 2158261 | 5/1984 | United Kingdom . |
| 2145242 | 3/1985 | United Kingdom . |
| 2149141 | 6/1985 | United Kingdom . |
| WO86/05281 | 9/1986 | WIPO . |

Primary Examiner—Stephen C. Buczinski
Attorney, Agent, or Firm—Nixon & Vanderhye

[57] ABSTRACT

A viewing system such as a panoramic sight for a tank, adapted for operation in both the visible and infra-red wavebands, comprising at least one common optical component which is receptive to both types of radiation and a means for subsequently separating the visible and infra-red radiation before reaching direct viewing and indirect viewing apparatus.

13 Claims, 6 Drawing Sheets

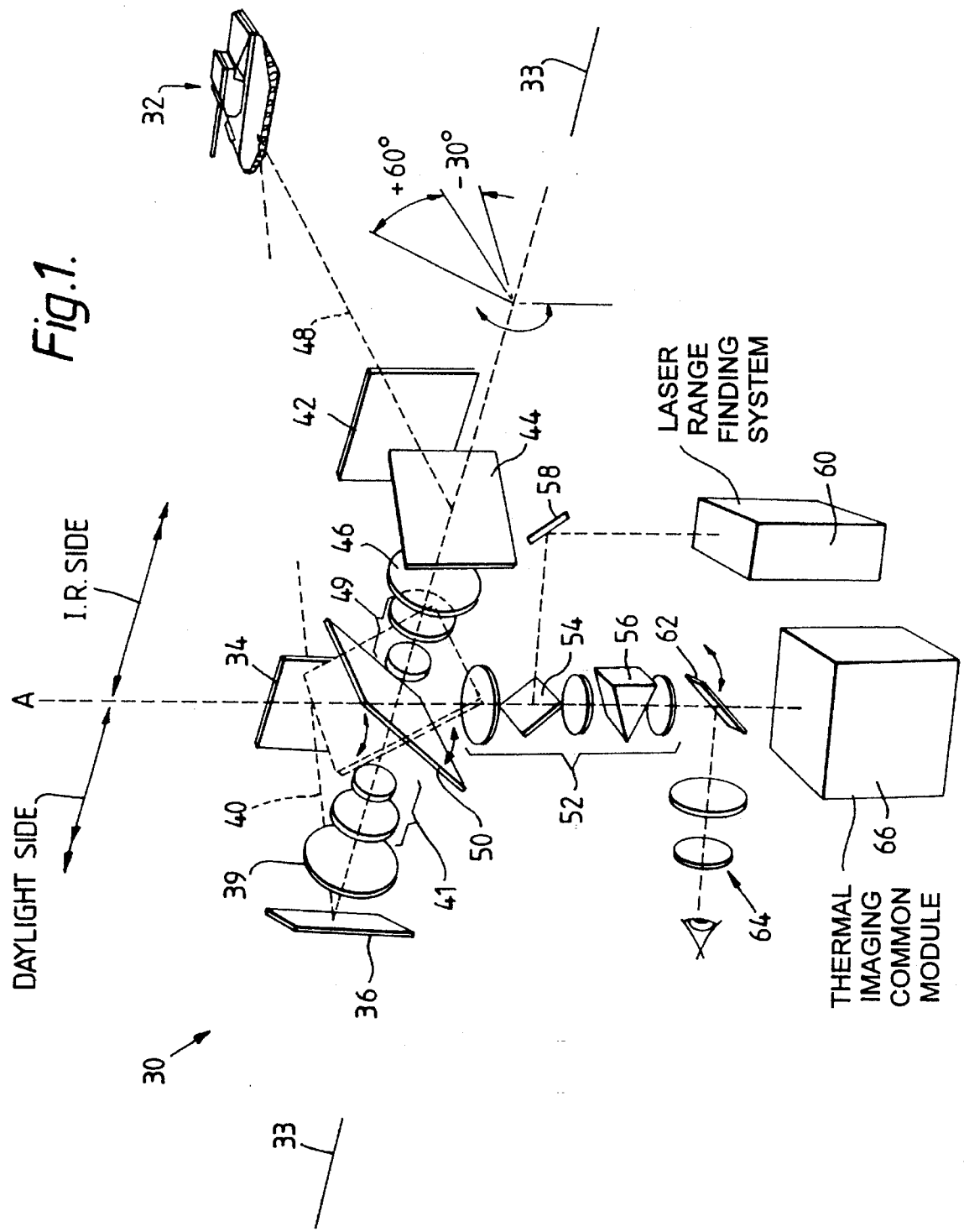

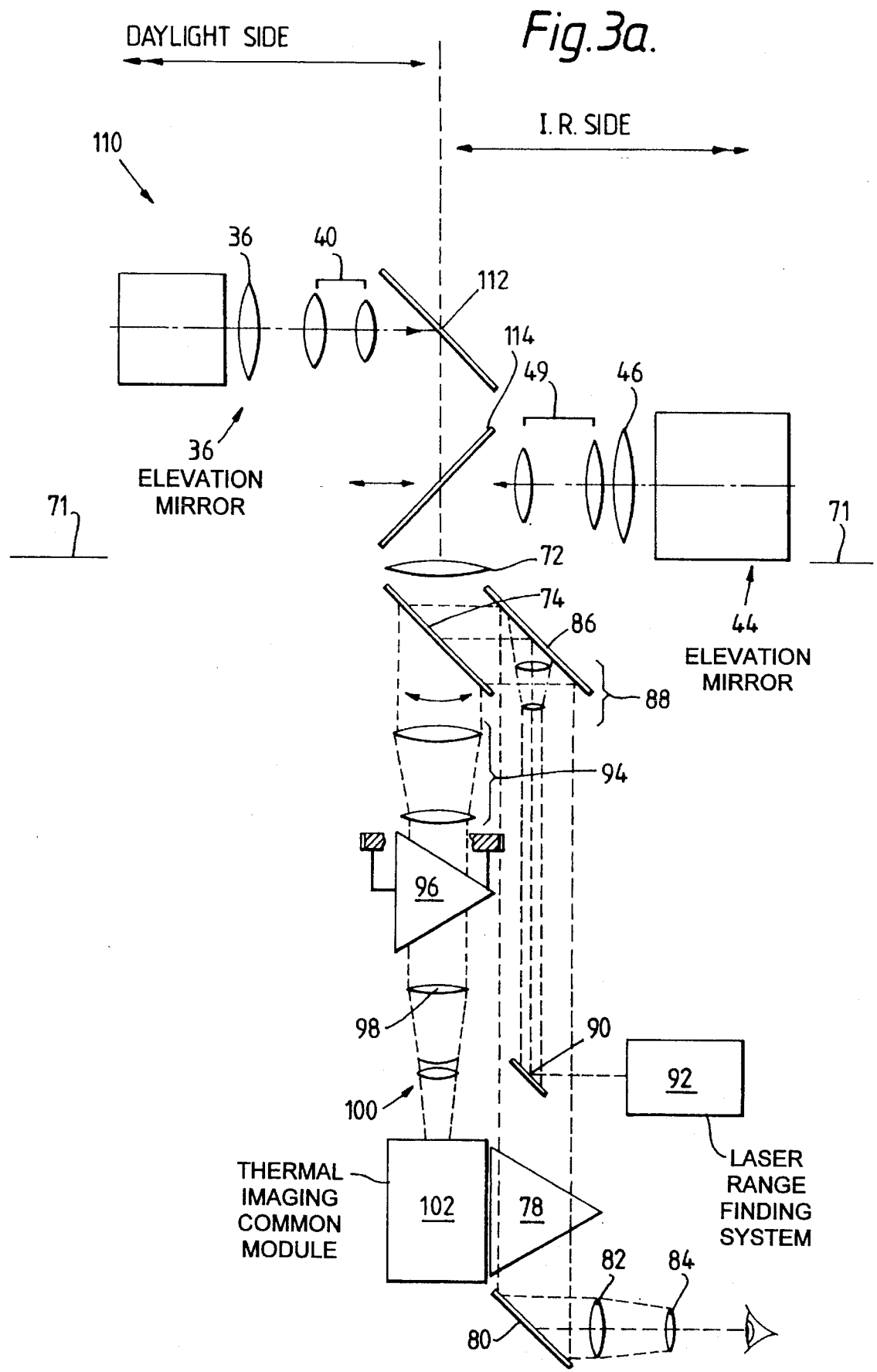

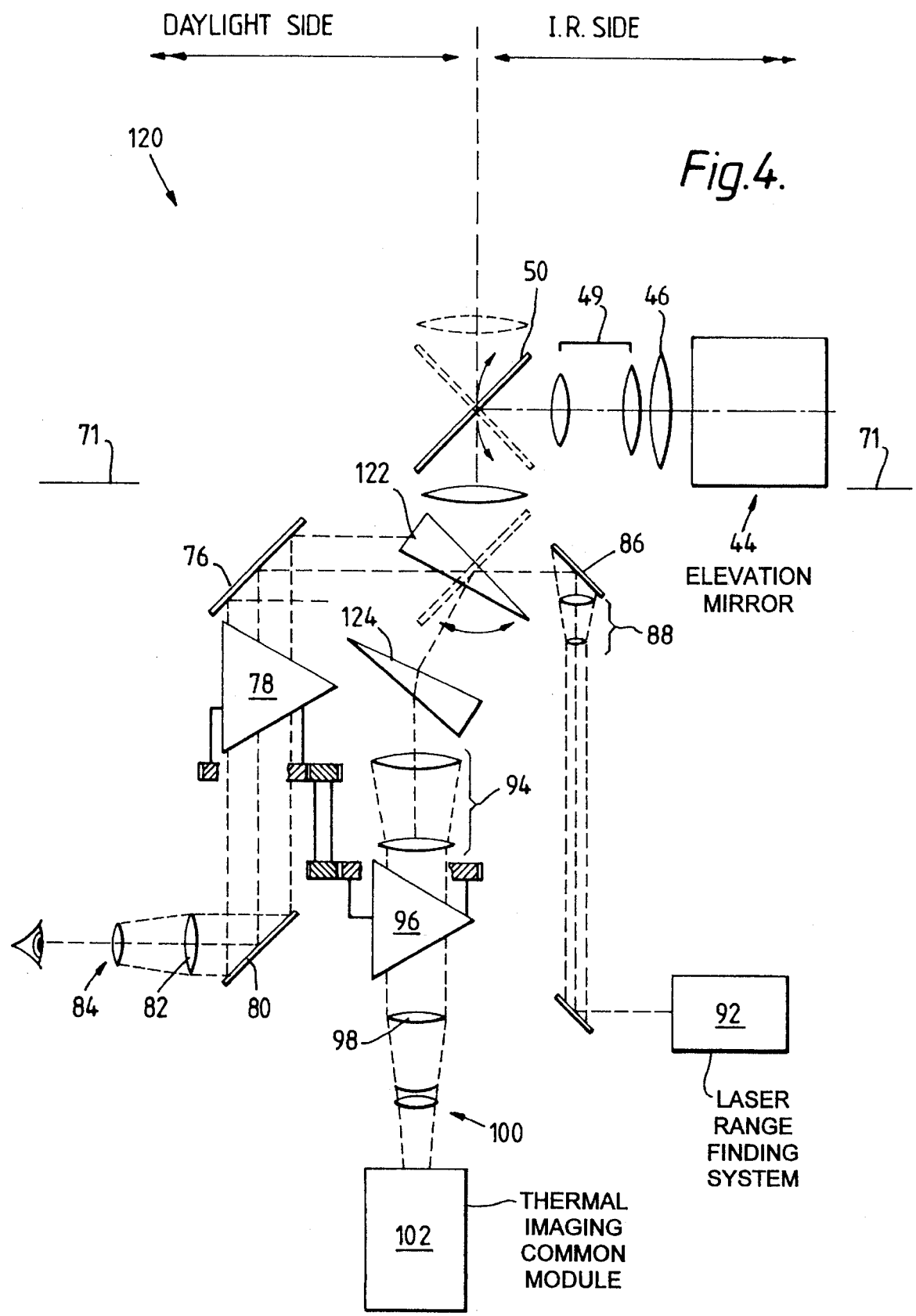

VIEWING SYSTEM

BACKGROUND OF THE INVENTION

The present invention relates to a viewing system and relates particularly, but not exclusively, to a panoramic sight for a military vehicle such as a tank.

Panoramic sights fitted to tanks enable the tank crew, under armour, to view the environment and to fulfil the functions of surveillance, target acquisition and target engagement. Viewing can be direct viewing i.e. by the human eye, or indirect viewing i.e. by a piece of apparatus such as a thermal imager or image intensifier. Furthermore, the viewing may be daylight viewing of optical radiation in the visible waveband or may involve thermal imaging of optical radiation in the infra-red waveband. It is also likely to be desirable to include laser range finding apparatus in the viewing system.

A known panoramic sight is shown in FIG. 1a. The panoramic sight is for direct daylight viewing and is indicated generally at 10 and comprises an objective window 12, an elevation mirror 14, an azimuth mirror 15, a system 16 for effecting field of view or magnification changes, a fixed mirror 18, a derotation prism 20, a telescope 22 and an exit pupil 24.

The elevation mirror 14 is servo driven and/or stabilised in the elevation axis over 90° and the objective window 12 is connected to the elevation mirror so that these move together mounted on bearings (not shown). Thus, the size of the objective window 12 does not restrict the field of view in elevation. The objective window 12, the elevation mirror 14 and the azimuth mirror 15 are armour protected but above armour level and are collectively mounted on a bearing (not shown) to allow a servo drive and/or stabilisation to be achieved in the azimuth axis over 360°. Below armour level, optical radiation from the field-of-view passes through the magnification changer 16 and is reflected by the fixed mirror 18 into the derotation prism 20 which is necessary to correct the image rotation which is introduced by both the elevational and the azimuthal angular movement.

SUMMARY OF THE INVENTION

Beam splitters (not shown) are used to introduce other facilities, such as laser range finding, into the optical path of the system.

An alternative proposal which has been made is to provide a panoramic sight with infra-red detecting means employing suitable optical components e.g. germanium components, and also incorporating laser range finding by using a beam splitter and a laser which operates in the infra-red e.g. a $CO_2$ laser.

With regard to a panoramic sight for a military vehicle it is desired to provide a system enabling direct daylight viewing and thermal imaging. One possibility would be to provide two sights one dedicated to daylight viewing and other dedicated to thermal imaging. However, the modern military vehicle is already heavily packaged with equipment so that space is at a premium. Furthermore, this approach would involve two separate holes being made in the vehicle armour protection which is undesirable.

A second approach would be to provide a single panoramic sight accommodating two optical paths, one for daylight viewing and one for thermal imaging, side by side. However, this approach precludes the simple rotation of the mirrors in each of the optical paths about the azimuth axis (except through very limited angles) and results in a relatively large package which has to rotate totally requiring a relatively large hole in the vehicle armour protection.

An object of the invention is to provide a viewing system adapted for detecting at least two different wavebands of optical radiation e.g. daylight and infra-red radiation which alleviates the problems inherent in the two approaches mentioned above.

According to the present invention we provide a viewing system receptive to first and second types of optical radiation comprising first and second means for viewing and/or detecting the first and second types of optical radiation respectively, optical components defining first and second optical paths leading to the first and second viewing and/or detecting means respectively wherein the two optical paths are originally separate and coincide along at least part of their length and subsequently separate before reaching the viewing and/or detecting means.

By "types" of optical radiation is meant infra-red, visible and ultra-violet radiation.

Thus, the present invention enables the provision of an integrated viewing system, such as a panoramic sight, adapted for both daylight viewing and thermal imaging and which may be relatively compact in comparison to the other possible approaches mentioned above.

The optical paths are originally separate so that separate objective windows are used for the two types of optical radiation.

Preferably, the viewing system comprises first and second objective windows which transmit the first and second types of optical radiation respectively and a set of optical components associated with each of the objective windows for directing the respective type of radiation along its respective optical path. It is desirable to have separate, dedicated, objective windows for the two types of radiation because known optical materials which are capable of transmitting in both the daylight and infra-red wavebands e.g. zinc sulphide and zinc selenide, are relatively soft. Therefore, in view of the need for wash-wiping on a military vehicle window a hard coating on the window surface is required and an adequate hard coating on these soft materials has yet to be achieved. According to this feature of the invention the daylight window may be hard coated glass and the thermal imaging window may be hard coated germanium.

Preferably, the viewing system comprises at least one optical component which is common to both optical paths and which reflects and/or transmits both types of radiation.

The common optical component may be movable between a first position in which it is operable to reflect or transmit the first type of radiation and a second position in which it is operable to reflect or transmit the second type of radiation. In the particular embodiments to be described, the common optical component is rotatable between the first and second positions and may be made from a material which transmits daylight and infra-red radiations e.g. from zinc sulphide or zinc selenide. Other materials also have this property as the skilled man will appreciate.

In a particular embodiment to be described, the first and second optical paths subsequently separate at a position remote from the point where the first and second optical paths coincide and in which a plurality of optical components each receptive to both types of radiation are positioned therebetween. According to this feature there are a relatively large number of optical components in the viewing system which are receptive to both types of radiation thereby reducing the total number of optical components in the system.

Optionally, the first and second optical paths subsequently separate at a position adjacent to the point where the first and second optical paths coincide and in which two separate sets of optical components are arranged between said position of separation and the first and second viewing and/or detecting means, each said set being receptive to one of the said two types of radiation. According to this feature, the number of optical components receptive to both types of radiation is kept to a minimum. This enables the complexity of the individual optical components in the system to be reduced since to achieve optical components which operate over a wide waveband requires a combination of lenses and coatings need to be used to compensate for aberrations.

The coincident portions of the first and second optical paths may begin and/or end at a beam splitter. The construction of the beam splitter may involve forming several coatings to achieve the desired operation. Alternatively, the coincident portions of the first and second optical paths may begin and/or end at a movable mirror.

Alternatively, the viewing system may comprise two optics packages, one optics package designed to handle the first type of optical radiation and the other optics package designed to handle the second type of optical radiation, wherein each of the optics packages is movable into and out of the optical paths of the two types of radiation so as to complete one of the optical paths.

BRIEF DESCRIPTION OF THE DRAWINGS

Particular embodiments of the present invention will now be described, by way of example, with reference to the accompanying drawings in which:

FIG. 1 is a schematic representation of a panoramic sight according to the present invention;

FIG. 4 is a schematic representation of a panoramic sight according to a fourth embodiment of the present invention.

DETAILED DESCRIPTION OF PREFERRED EMBODIMENTS

Figure 1A:
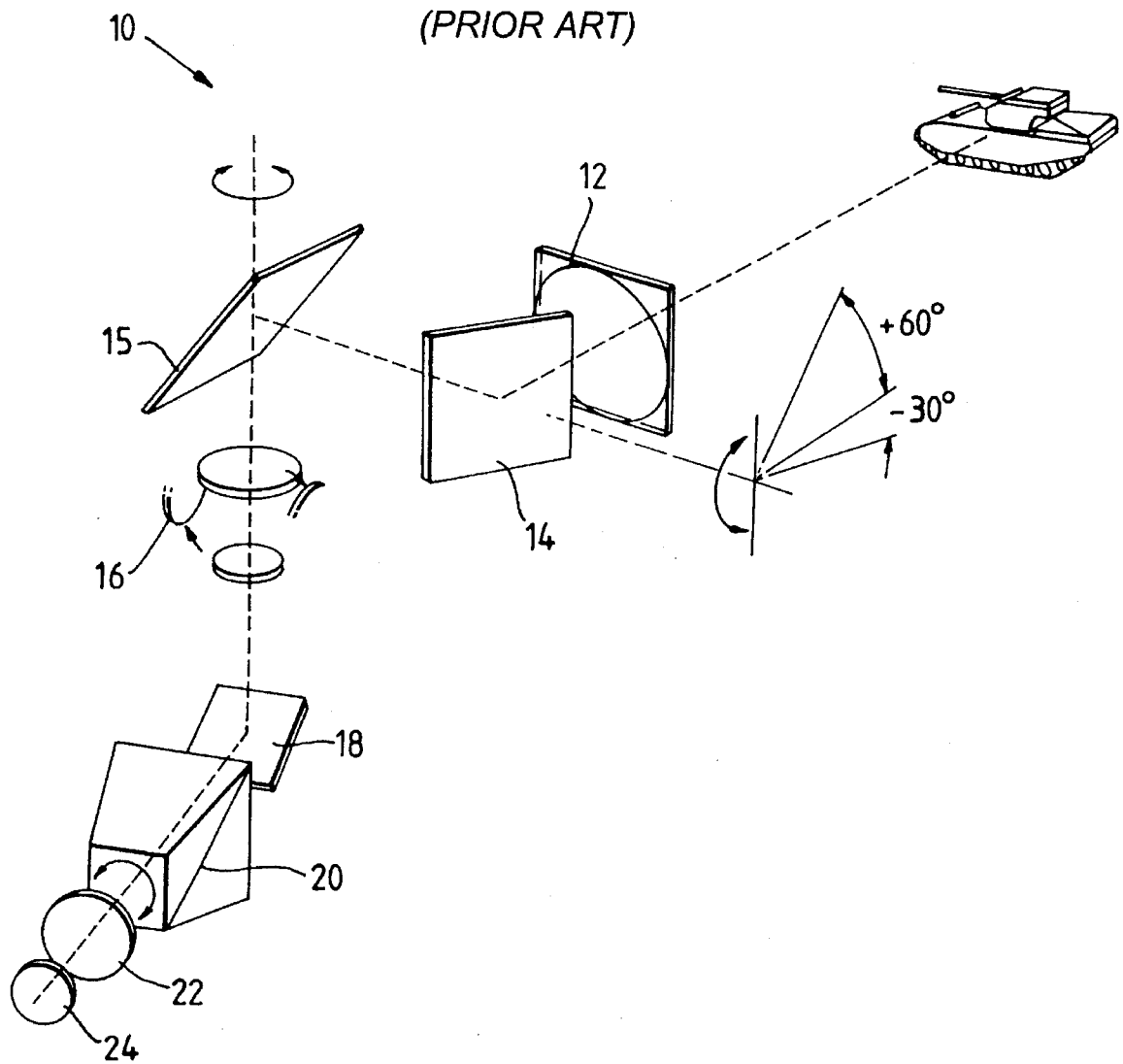
FIG. 1a is a schematic representation of a known sight.

Referring to FIG. 1, a panoramic sight is indicated generally at 30 and a notional target to be viewed is indicated at 32. The armour level is indicated at 33. The panoramic sight 30 has a central axis A. Above armour level on the left of axis A are optical components receptive to daylight (referred to as the "daylight side" in the diagram). Above armour level on the right hand side of axis A are optical components receptive to infra-red radiation (referred to as the "IR side" in the diagram). On the daylight side is a 55 mm diameter objective window 34 made of hard coated glass, an elevation mirror 36 and the major components of a daylight telescope, including an objective lens 39, defining an optical path 40 for visible radiation. A magnification changer is indicated at 41. On the IR side of the panoramic sight 30 there is an 80 mm diameter objective window 42 made of hard-coated germanium, an elevation mirror 44 and the major components of an infra-red telescope including an objective lens 46, defining an optical path 48 for infra-red radiation. A magnification changer is indicated at 49. The elevation mirrors 36 and 44 are mechanically coupled so that they move totally in sympathy through a 90° range as indicated in FIG. 1.

The daylight and infra-red optical paths 40 and 48 meet at a common optical component in the form of a azimuth mirror 50 which is rotatable between first and second positions (the second position is shown dotted in FIG. 1). The azimuth mirror 50 comprises a material which reflects both daylight and infra-red radiation e.g. the mirror 50 may be aluminium coated. In the first position the azimuth mirror 50 reflects infra-red radiation received from the field-of-view downwardly to a set 52 of further common optical components. In the second position, the azimuth mirror 50 reflects daylight received from the field-of-view downwardly to the set 52 of further common optical components.

The set 52 of common optical components are made of a material which transmits both daylight and infra-red radiation e.g. zinc sulphide or zinc selenide and comprises a beam splitter 54 and a derotation prism 56. The function of the beam splitter is to transmit both daylight and infra-red radiation whilst reflecting laser light via a mirror 58 to a laser range finding system 60.

The panoramic sight 30 further comprises a mirror 62 which is movable into and out of the path of radiation leaving the derotation prism 56. When the mirror 62 is in the position shown in FIG. 1 it reflects daylight to an exit pupil 64 for direct viewing. When the mirror 62 is moved, radiation passes directly to a thermal imaging common module (TICM) 66.

In the embodiment described above, both the azimuth mirror 50 and the lower mirror 62 may be moved by rotation and/or translation.

As an alternative, the movable mirror 62 could be replaced by a beamsplitter which reflects daylight and transmits infra-red radiation.

The panoramic sight 30 described above does not permit simultaneous viewing of the daylight and infra-red scene but an embodiment to be described does possess this facility. Transfer between daylight and infra-red viewing may be manually controlled by the observer or may be automatic according to requirements.

Figure 2:
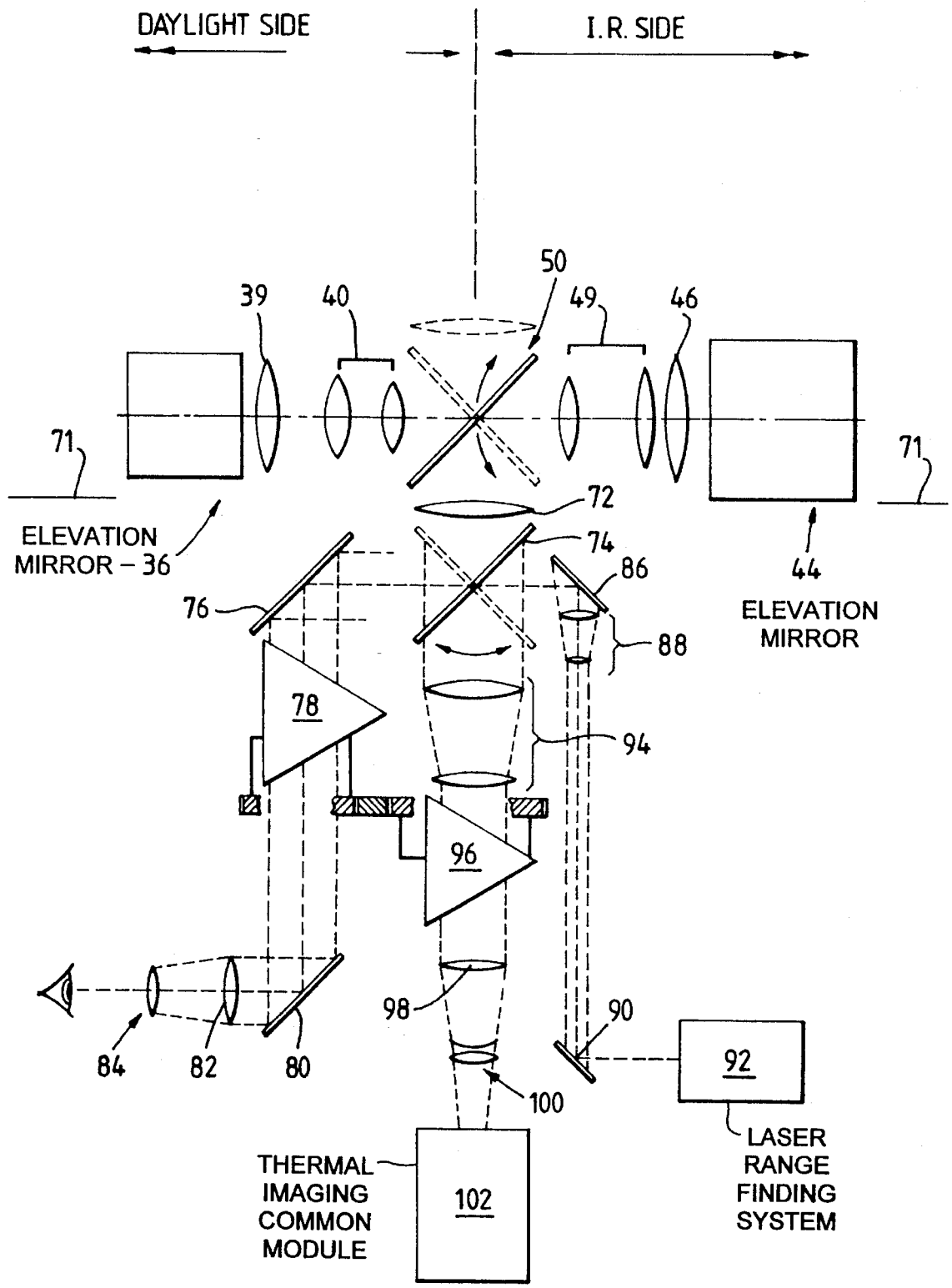
FIG. 2 is a schematic representation of a panoramic sight according to a second embodiment of the present invention.

Referring to FIG. 2, a panoramic sight indicated generally at 70 comprises the same components above armour level, indicated at 71, as that shown in FIG. 1 and these therefore carry the same reference numerals as used in FIG. 1 and will not be redescribed. Below armour, a lens 72 which transmits daylight, infra-red radiation and laser light directs received radiation onto a mirror 74 which is rotatable between a first position shown in full lines in FIG. 2 and a second position shown in dotted lines in FIG. 2. In the first position, the mirror 74 is operable to reflect daylight onto a daylight receiving mirror 76 which then directs the daylight to a derotation prism 78 and onto a further mirror 80 which directs the daylight image through a lens 82 and onto an exit pupil 84 for direct viewing. In the second position, the mirror 74 reflects laser light to a laser receiving mirror 86 which directs the laser light through a focusing arrangement 88 onto a further mirror 90 for reception by a laser range finding system 92. The mirror 74 is movable out of the optical path of radiation from the common lens 72 to allow infra-red radiation to pass to an arrangement 94 for producing a collimated beam and through a derotation prism 96, through a further lens 98 onto an exit pupil 100 for reception by a thermal imaging device 102.

If the daylight entering the panoramic sight 70 is collimated, the lens 72 may be designed to transmit infra-red radiation only and be movable to allow daylight to pass. For example, the azimuth mirror 50 may be rotatable about a horizontal axis together with the lens 72 so that the lens 72 moves to the position shown in dotted lines in FIG. 2 when thermal imaging is to take place.

The derotation prisms 78 and 96 are mechanically coupled so that a single servo system is sufficient.

This embodiment has the advantage of eliminating all but one infra-red powered component.

As an alternative, the mirror 74 may conveniently be configured to operate as a beam splitter which reflects daylight and transmits infra-red radiation. In this case the reverse face of the mirror 74 could be designed to reflect laser light so that laser rangefinding could be carried out on movement of the mirror 74 to the dotted position in FIG. 2.

The panoramic sight 70 shown in FIG. 2 involves maximum use of dedicated optics which means a slight increase in the size of the azimuth diameter. However, the optical components receptive to daylight are usually smaller than those receptive to infra-red radiation and, with careful packaging, an acceptably compact arrangement can be reached.

Figure 3:
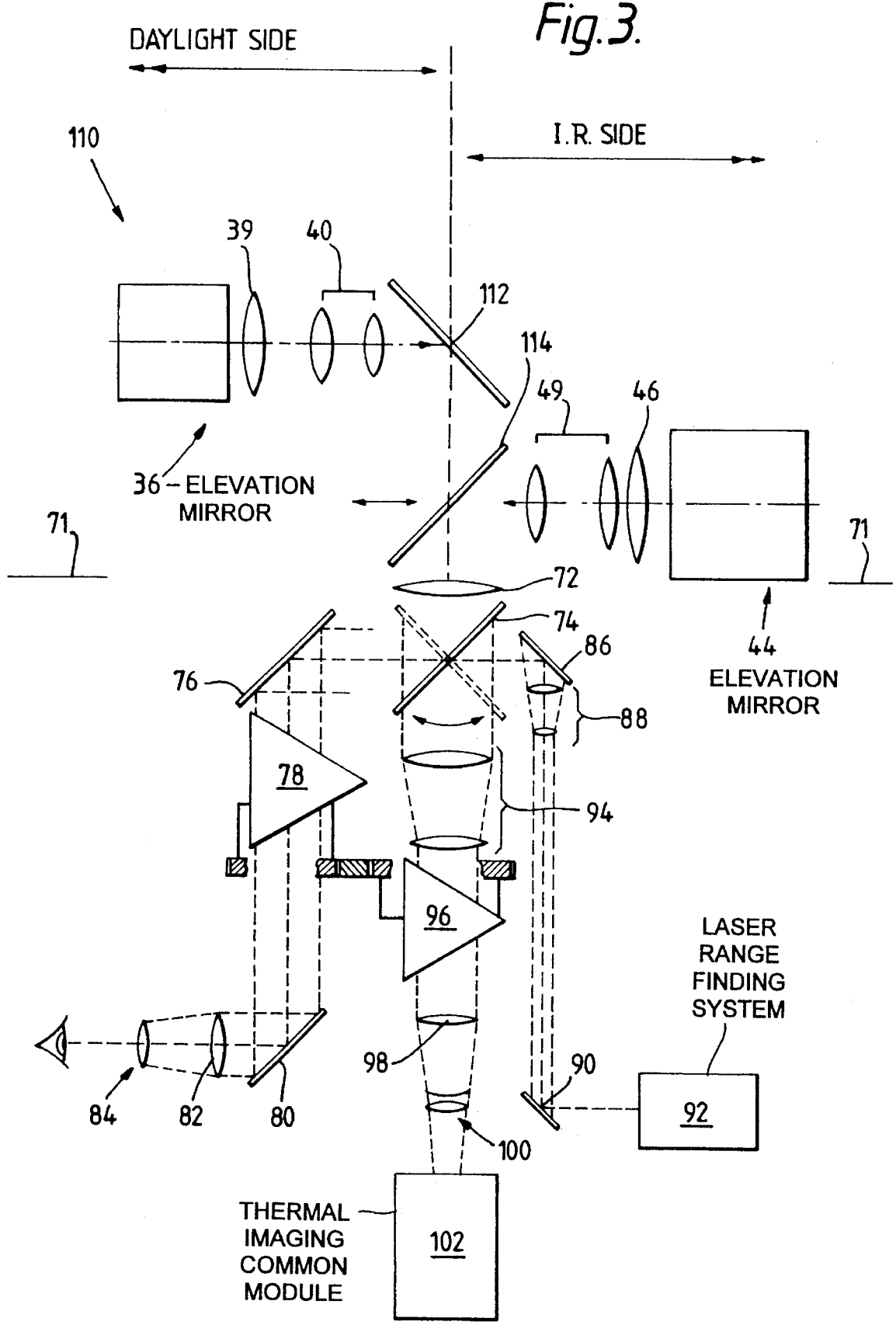
FIG. 3 is a schematic representation of a panoramic sight according to a third embodiment of the present invention.

Referring now to FIG. 3, a panoramic sight indicated generally at 110 is substantially similar to the panoramic sight shown in FIG. 2 apart from the fact that the daylight elevation mirror 36 and the infra-red elevation mirror 44 are moved independently in elevation. This feature can help provide scope for manoeuvre in increasing the compactness of the apparatus. Two azimuth mirrors 112 and 114 are provided. The azimuth mirror 112 is for reflecting daylight and the azimuth mirror 114 must perform the function of a beam splitter i.e. it must transmit daylight and reflect infra-red radiation. Alternatively, the azimuth mirror 114 may not be a beamsplitter but may be movable so as to allow daylight to pass.

If the azimuth mirror 114 is a beamsplitter and the movable mirror 74 is replaced by a beamsplitter which transmits infra-red radiation and reflects daylight, simultaneous direct (daylight) viewing and thermal imaging is possible.

Furthermore, this embodiment also enables independent "parking" of the two objective windows 34 and 42. Parking in this context means movement of an objective window to a downwardly facing, inoperative, position. Thus, one of the objective windows which is not being used can be parked thereby reducing vulnerability to shell damage and to detection by the enemy.

If desired, the infra-red input components could be placed above the daylight input components in which case the daylight azimuth mirror 112 would either have to be a beamsplitter or be movable to allow infra-red radiation to pass.

Another alternative, at least theoretically, would be to use as component 74, a beamsplitter which reflects daylight, transmits infra-red and reflects laser light (by notch reflection) in which case the daylight and laser light pathe would be made coincident. With respect to FIG. 2, this could be achieved by making the mirror 86 much larger, moving the mirror 90 up closer to the focussing arrangement 88 and positioning the derotation prism 78 below the mirror 90 to receive daylight. Such an arrangement would obviate the need to move component 74 but would mean that the daylight detecting system would have to be tolerant of some vignetting due to the superpositioning of the laser light path in the centre of the daylight path. This alternative is shown in FIG. 3a and could equally well apply to the embodiment shown in FIG. 2.

FIG. 4 illustrates a panoramic sight 120 which is similar to the one shown in FIG. 2 apart from comprising two deviation prisms 122 and 124 for deviating the optical path of infra-red radiation so that it is offset from the optical paths of daylight and laser light i.e. the infra-red radiation is deviated out of the plane of the paper. This feature permits the panoramic sight as a whole to be made more compact or, alternatively, releases more space for use.

In the embodiments of panoramic sights described above, it is important that the objective lenses 46 of the infra-red telescopes are placed near the infra-red objective window 42 in each case as this minimises 'vignetting' of which infra-red optical components are not very tolerant. The objective lens 39 of the daylight telescope may however be remote from the daylight objective window 34 if desired.

It is envisaged that a panoramic sight according to the invention may also comprise a t.v. camera which may be boresighted to the infra-red and/or daylight line of sight and can have matching field-of-view to either or both of the daylight and infra-red viewing systems. A further alternative would be to incorporate an image intensifier in the system.

It is envisaged that, in an alternative embodiment, two dedicated optics packages could be provided, one for handling visible radiation and the other for handling infra-red radiation. Both packages would be movable into and out of the optical paths of both types of radiation so as alternatively to provide means for completing the two optical paths.

As well as being applicable to panoramic sights for military vehicles such as tanks, the invention may also find naval application e.g. in submarines. Furthermore, it is not restricted to panoramic sights but may also find application in other types of viewing systems e.g. a grounded or airborne target surveillance system for detecting aircraft or missiles.

I claim:

1. A viewing system receptive to first and second types of optical radiation comprising first and second means for viewing and/or detecting the first and second types of optical radiation respectively, said first and second means comprised of first and second objective windows which transmit the first and second types of optical radiation, respectively, and a set of optical components associated with each of the objective windows for directing the respective type of radiation along its respective optical path, said optical components defining first and second optical paths leading to the first and second viewing and/or detecting means respectively, wherein the two optical paths are originally separate and coincide along at least part of their length and subsequently separate before reaching the viewing and/or detecting means.

2. A viewing system according to claim 1 comprising a mirror movable in elevation associated with each of the objective windows, said two mirrors being connected so as to move in sympathy.

3. A viewing system according to claim 1 comprising a mirror movable in elevation and associated with each of said two objective windows, said mirrors being independently movable.

4. A viewing system according to any preceding claim comprising at least one optical component which is contain to both optical paths and which reflects or transmits both types of radiation.

5. A viewing system according to claim 4 wherein said at least one common optical component is movable between a first position in which it is operable to reflect or transmit the first type of radiation and a second position in which it is operable to reflect or transmit the second type of radiation.

6. A viewing system according to claim 5 comprising means for rotating said at least one common optical component between the first and second positions.

7. A viewing system according to claim 4 wherein the common optical component is made from one of zinc sulphide and zinc selenide.

8. A viewing system according to claim 1 wherein the two types of radiation are visible light and infra-red radiation.

9. A viewing system according to claim 1 wherein the first and second optical paths subsequently separate at a position remote from the point where the first and second optical paths coincide and in which a plurality of optical components each receptive to both types of radiation are positioned therebetween.

10. A viewing system according to claim 1 wherein the first and second optical paths subsequently separate at a position adjacent to a point where the first and second optical paths coincide and in which two separate sets of optical components are arranged between said position of separation and the first and second viewing and/or detecting means, each said set being receptive to one of said two types of radiation.

11. A viewing system according to claim 1 wherein said optical paths have coincident portions and the coincident portions of the first and second optical paths begins and/or ends at a beam splitter.

12. A viewing system according to claim 1 wherein the optical paths have coincident portions and the coincident portions of the first and second optical paths begins and/or ends at a movable mirror.

13. A viewing system according to claim 1 comprising two optics packages, one optics package designed to handle the first type of optical radiation and the other optics package designed to handle the second type of optical radiation, wherein each of the optics packages is movable into and out of the optical paths of the two types of radiation so as to complete one of the optical paths.

* * * * *